(12) United States Patent
Bik et al.

(10) Patent No.: US 7,788,481 B2
(45) Date of Patent: Aug. 31, 2010

(54) COMPUTER NETWORK PROTECTION

(75) Inventors: Albert Louis Ceasar Christophorus Matthias Bik, Lisse (NL); Alexander Johannes Gerardus Degen, The Hague (NL); Coenraad Leo Siman Visser, Zoetermeer (NL); Rajesh Lachman, Rotterdam (NL); Franciscus Hendrikus Nielen, The Hague (NL)

(73) Assignee: Nederlandse Organisatie voor toegepastnatuurweterns chappelijk Onderzoek TNO, Delft (NL)

( * ) Notice: Subject to any disclaimer, the term of this patent is extended or adjusted under 35 U.S.C. 154(b) by 1208 days.

(21) Appl. No.: 10/524,725

(22) PCT Filed: Aug. 15, 2003

(86) PCT No.: PCT/NL03/00585

§ 371 (c)(1),
(2), (4) Date: Aug. 30, 2005

(87) PCT Pub. No.: WO2004/017599

PCT Pub. Date: Feb. 26, 2004

(65) Prior Publication Data

US 2006/0253774 A1    Nov. 9, 2006

(30) Foreign Application Priority Data

Aug. 19, 2002   (NL)  .................. 1021300

(51) Int. Cl.
*H04L 29/06* (2006.01)
(52) U.S. Cl. .......... 713/153; 713/160; 726/12; 709/238
(58) Field of Classification Search .......... 713/154, 713/160, 161
See application file for complete search history.

(56) References Cited

U.S. PATENT DOCUMENTS

| | | | | |
|---|---|---|---|---|
| 5,594,796 A | * | 1/1997 | Grube et al. | 380/270 |
| 6,271,756 B1 | * | 8/2001 | Davies et al. | 340/572.7 |
| 2002/0016922 A1 | | 2/2002 | Richards et al. | 713/200 |
| 2002/0112015 A1 | | 8/2002 | Haynes | 709/206 |
| 2003/0079158 A1 | * | 4/2003 | Tower et al. | 714/23 |
| 2007/0199063 A1 | * | 8/2007 | Howard et al. | 726/12 |

\* cited by examiner

*Primary Examiner*—Matthew B Smithers
(74) *Attorney, Agent, or Firm*—Norris McLaughlin & Marcus, PA

(57) ABSTRACT

The computer system comprises a local network domain of communicating computers and a connection for communication with an external network. A gate device coupled between the local network and the connection is arranged to check files sent from the local network to the connection for the presence of a security tag in the file, and to send or not send on each file to the connection depending on detection of the presence or absence of the security tag in the file.

Figure 1:
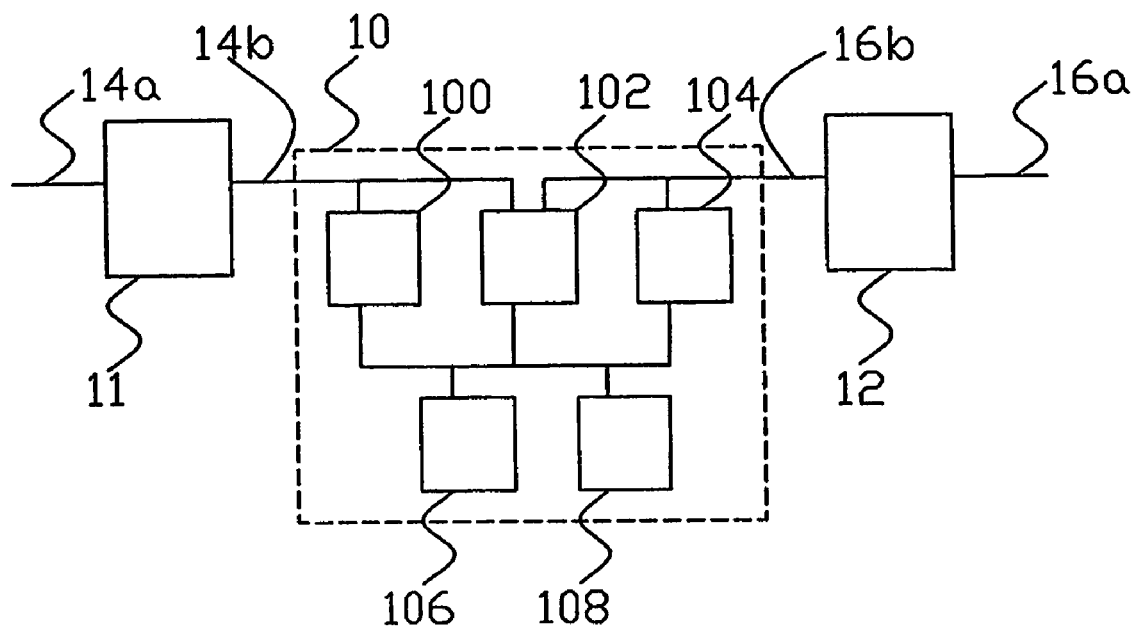

12 Claims, 1 Drawing Sheet

COMPUTER NETWORK PROTECTION

This application is a 371 of PCT/NL2003/000585, filed Aug. 15, 2003.

The invention relates to protection against unauthorized access to (copies of) files stored in a computer network.

It is known in the present situation that in order to guarantee the confidentiality of electronic documents (also referred to below as "files") codes indicating which users are allowed to open the document are stored in a file system. Thus, for instance, this code can indicate whether only the author of the file has an access right or also a group to which this author belongs, or that everyone has an access right. When a user attempts to read such a file, the control system checks whether the respective user has an access right according to the codes for the requested file. Only if this is the case, the control system allows access.

This form of access control has the drawback that it is bound to the file system. This form of access control requires that users be divided previously into different kinds.

Another form of access control is the encryption of confidential files. Only those who have at their disposal the key required for the encryption of the file can get access in this way. The advantage over access codes is that now also all content-containing copies of the file are protected wherever they are. It is a drawback, however, that each time a key and decryption are required before access to the file is possible.

For protection against computer viruses, it is known besides to make use of a so-called firewall for the transport of files to a computer system. A firewall blocks the reception of files by a computer system when the file satisfies predetermined characteristics. A firewall, however, does not serve to keep confidential selected confidential files among files sent by the computer system.

It is, inter alia, an object of the invention to provide a computer system which makes it possible to selectively limit the access to files without requiring extra measures when copies are made within the computer system and without requiring encryption.

The computer system according to the invention is defined in claim 1. The invention makes use of a gate device in a communication channel between a network domain and an external connection such as a connection to the Internet. The gate device is arranged to check for the presence of a security tag all files sent to the external connection via the communication channel. Depending on the presence or absence of this security tag, the gate device limits the free sending of the file to the external connection.

In this way, a file-selective check is performed for the access possibilities to the file outside the network domain. Within the network domain, every user has access, in principle, to the file. But out of that, the access is limited. In this way, a domain specific protection is provided. In the most extreme form, the gate device blocks the sending, depending on the presence or absence of this security tag. In principle, the invention can be applied to all forms of file sending, for instance sending as part of e-mail protocols (SMTP), as part of file transfer protocols (FTP), as part of hyperlink protocols (HTTP) or any other sort of protocol.

Preferably, all communication channels of the network domain to external connections are provided with such a gate device. In one embodiment, the gate device limits free sending of files provided with such a security tag. In this way, existing or externally received files remain freely accessible, and users can themselves ask for protection.

The invention, however, is not limited to complete obstruction. In another embodiment, for instance, the gate device automatically encrypts all files provided with a security tag when these files are sent via the communication channel. In this way, protection is offered outside the network domain by means of encryption. In yet another embodiment, the security tag is combined with an anti-tamper code which makes it practically impossible to remove the tag.

These and other objects and advantageous aspects of the computer system according to the invention will be described in more detail with reference to the following Figures.

Figure 2:
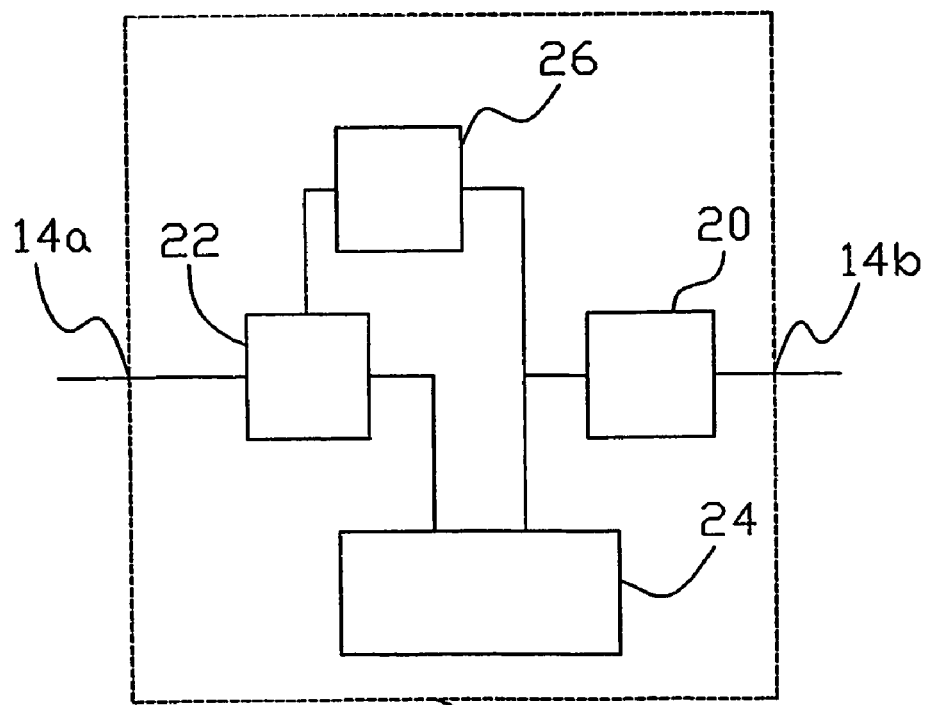

FIG. 1 shows a computer system
FIG. 2 shows a gate device

FIG. 1 shows a computer system with external connections 14a, 16a. The computer system comprises a domain 10 containing a number of computers 100, 102, 104, 106, 108, which are connected with each other via connections. A part of the computers 100, 102, 104, 106, 108 is connected with communication channels 14a,b, 16a,b, which run via the external connections to further computers (not shown). Located in the communication channels 14a,b, 16a,b are gate devices 11, 12. The gate devices each preferably form part of a device which also has other security tasks such as the effectuation of a firewall etc. In use, files are stored in one or more of the computers in domain 10, which files can be read via the connections from all computers in the domain. These files can be provided with security tags. In an HTML file, the security tag could, for instance, be implemented by addition of a piece of text in the form of <SECURITY></SECURITY>, optionally supplemented with parameters. Of course, the security tag may be supplemented in all kinds of other ways, for instance by addition of other sorts of codes, or by applying a watermark in the file. Preferably, the computer is arranged to also automatically encrypt the file or the important part thereof when applying the security tag. In this way, an extra protection is realized.

When a file is sent from a computer in the domain via one of the communication channels to one of the external connections 14a, 16a, this occurs via the gate device 11 or 12. The respective gate device 11, 12 checks the file for the presence of the security tag before sending on the file to the external connection 14a, 16a. The gate device 11, 12 sends on the file only if it does not find the security tag. Besides, the gate device 11, 12 preferably stores data on the sending of the file in a log file, at least if the sending has been obstructed. This enables the system manager to check for breaches later.

FIG. 2 shows an embodiment of a gate device 11 in more detail. The gate device 11 contains a first transceiver 20 for the local part of the communication channel 14b, a second transceiver 22 for the external connection 14a, a memory 24 and a tag detector 26. Transceivers 20, 22 are coupled to the memory 24. The detector 26 has an input coupled to the first transceiver 20 for the local part of the communication channel 14b and an output coupled to the second transceiver 22 for the external connection 14a.

In operation, the first transceiver 20 receives messages from the local part of the communication channel 14b and stores these messages temporarily in the memory 24. The detector 26 examines the content of the message for the presence of a file containing a security tag and sends, depending on a result of that examination, a command to the second transceiver 22. When the command purports to pass the message, the second transceiver 22 reads the message from the memory 24 and sends the message to the external connection 14a. When the message is not sent on, the message is removed from the memory 24, for instance by overwriting it with a later message without sending on the message.

The computers in the domain 10 are arranged to read or copy the respective files without a check on the security tag on all computers in the domain. In this way, it is possible to store and copy files in the domain 10 in arbitrary places, but undesired or accidental sending to external connections 14a,b outside the domain is made impossible.

Without departing from the principle of the invention, all kinds of other embodiments are, of course, possible. Thus, for instance, the gate device 11, 12 may exactly not send on the file when no security tag is present. As a result, a user may deliberately choose to protect a file from sending.

As part of the protection, a tamper protection may be included such as, for instance, a code encrypted with a private key, which code can be decrypted with a public key and contains a number which is a function of the content of the file including the security tag. Before sending the file, the gate device may again calculate the code, then, on the basis of the file and compare with the code following from the file by public key decryption. In this way, it is ensured that the security tag cannot be changed. Also, the tag can be included in specific sorts of files as a watermark.

Furthermore, the gate device 11, 12, instead of not sending the file, may encrypt the file before sending it when the security tag indicates that free sending is not allowed. If desired, it may even be indicated with parameters in the security tag which action (for instance not sending or sending encryptedly) the file must undergo when passing the gate device 11, 12.

The invention claimed is:

1. A gate device with a connection for connecting to a local network and a connection for an external network, wherein the external network is located outside the local network domain, wherein the connection provides at least one communication channel between the local network and the external network, wherein the gate device is located in the at least one communication channel and configured to
   (a) perform a file-selective check for access possibilities to a file outside the local network by checking the file sent from the local network to the connection for presence of a security tag before the file is sent to the external network via the at least one communication channel, and
   (b) block the sending of the file to the external network if the security tag is found to be present in the file.

2. A method for protecting information transport from a local network domain of communicating computers to an external network located outside the local network domain, wherein at least one communication channel connects the local network domain and the external network, the method comprising the steps of:
   providing a security tag in a file accessible by the communicating computers;
   coupling a gate device to the local network domain and the external network, wherein the gate device is located in the at least one communication channel and between the local network domain and the external network;
   performing a file-selective check for access possibilities to the file outside the local network domain via the gate device checking the file sent from the local network domain for presence of a security tag before the file is sent to the external network via the at least one communication channel, and
   blocking the sending of the file to the external network if the security tag is found to be present in the file.

3. A computer system, comprising:
   a local network domain of communicating computers, wherein the communicating computers are configured to access a file;
   a first connection for communication with an external network, wherein the external network is located outside the local network domain of communicating computers, wherein the first connection provides at least one communication channel between the local network domain and the external network; and
   a first gate device is located in the at least one communication channel and coupled between the local network domain and the external network, wherein the first gate device is configured to
   (a) perform a file-selective check for access possibilities to the file outside the local network domain by checking the file sent from the local network domain to the first connection for presence of a security tag before the file is sent to the external network via the at least one communication channel, and
   (b) block the sending of the file to the external network if the security tag is found to be present in the file.

4. The computer system according to claim 3, further comprising:
   one or more second gate devices coupled between the local network domain and the external network, wherein the one or more second gate devices are located within the at least one or more communication channels and configured to
   (a) perform file-selective checks for access possibilities to files outside the local network domain by checking the files sent from the local network domain for the presence of security tags before sending the files to the external network via the one or more communication channels, and
   (b) block the sending of the files if the security tags are found to be present in the files.

5. The computer system according to claim 3, further comprising:
   an encrypted file automatically generated by the gate device if the security tag is found to be present in the file.

6. The computer system according to claim 5, wherein the gate device is configured to send the encrypted file to the external network via the at least one communication channel.

7. The computer system according to claim 3, further comprising:
   anti-tamper code combinable with the security tag to prevent removal of the security tag from the file.

8. The computer system according to claim 3, wherein each of the communicating computers is configured to apply the security tag to the file.

9. The computer system according to claim 3,
   an encrypted file or an encrypted portion of a file generated by a communicating computer when the communicating computer applies the security tag to the file.

10. The computer system according to claim 3, further comprising
    a memory means for storing data located within the gate device, wherein the gate device is configured to store data regarding presence of the security tag and/or sending of the file in a log file in the memory.

11. The computer system according to claim 3, further comprising:
    a tag detector located within the gate device, wherein the tag detector is configured to examine the file for presence of the security tag.

12. A gate device with a connection for connecting to a local network and a connection for an external network, wherein the external network is located outside the local network domain, wherein the connection provides at least one communication channel between the local network and the external network, wherein the gate device is located in the at least one communication channel and configured to (a) perform a file-selective check for access possibilities to a file outside the local network by checking the file sent from the local network to the connection for presence of a security tag before the file is sent to the external network via the at least one communication channel, and (b) send the file to the external network only if the security tag is found to be present in the file.

* * * * *

UNITED STATES PATENT AND TRADEMARK OFFICE
CERTIFICATE OF CORRECTION

| | | |
|---|---|---|
| PATENT NO. | : 7,788,481 B2 | Page 1 of 1 |
| APPLICATION NO. | : 10/524725 | |
| DATED | : August 31, 2010 | |
| INVENTOR(S) | : Albert Louis C. C. M. Bik et al. | |

It is certified that error appears in the above-identified patent and that said Letters Patent is hereby corrected as shown below:

On the Title Page Item (75), Inventors: "Coenraad Leo Siman Visser, Zoetermeer (NL)"

should read

-- Coenraad Leo Siman Visser, The Hauge (NL) --

On the Title Page Item (73) Assignee: "Nederlandse Organisatie voor toegepastnatuurwetens chappelijk Onderzoek TNO"

should read

-- NEDERLANDSE ORGANISATIE VOOR TOEGEPAST-NATUURWETENSCHAPPELIJK ONDERZOEK TNO --

Signed and Sealed this
Fifteenth Day of February, 2011

David J. Kappos
*Director of the United States Patent and Trademark Office*

UNITED STATES PATENT AND TRADEMARK OFFICE
CERTIFICATE OF CORRECTION

PATENT NO. : 7,788,481 B2
APPLICATION NO. : 10/524725
DATED : August 31, 2010
INVENTOR(S) : Albert Louis C. C. M. Bik et al.

Page 1 of 1

It is certified that error appears in the above-identified patent and that said Letters Patent is hereby corrected as shown below:

On the Title Page, Item (75) Inventors: "Coenraad Leo Siman Visser, Hauge (NL)"

should read

-- Coenraad Leo Siman Visser, The Hague (NL) --

Signed and Sealed this
Third Day of April, 2012

David J. Kappos
*Director of the United States Patent and Trademark Office*